United States Patent [19]

Gebhardt

[11] Patent Number: 4,919,256
[45] Date of Patent: Apr. 24, 1990

[54] LOADING ROLLER CONVEYOR WITH DRIVE VIA INTERMEDIATE ROLLERS

[75] Inventor: Elfriede Gebhardt, Sinsheim, Fed. Rep. of Germany

[73] Assignee: Gebhardt Fordertechnik GmbH, Sinsheim, Fed. Rep. of Germany

[21] Appl. No.: 282,509

[22] Filed: Dec. 12, 1988

[30] Foreign Application Priority Data

Jan. 30, 1988 [DE] Fed. Rep. of Germany ....... 3802819

[51] Int. Cl.⁵ ............................................. B65G 13/06
[52] U.S. Cl. .................................... 198/781; 198/790
[58] Field of Search ...................... 198/780, 781, 790

[56] References Cited

U.S. PATENT DOCUMENTS

| 3,884,727 | 11/1974 | Gebhardt | 198/781 |
| 3,939,962 | 2/1976 | Gebhardt | 198/781 |
| 4,291,796 | 9/1981 | Gebhardt | 198/781 X |
| 4,473,149 | 9/1984 | Vogt et al. | 198/781 |
| 4,572,353 | 2/1986 | Felder | 198/781 X |

FOREIGN PATENT DOCUMENTS

| 220275 | 7/1973 | Fed. Rep. of Germany | 198/781 |
| 2214838 | 10/1973 | Fed. Rep. of Germany | 198/781 |
| 2310154 | 9/1974 | Fed. Rep. of Germany | 198/781 |
| 3620740 | 1/1987 | Fed. Rep. of Germany | 198/790 |
| 2003814 | 3/1979 | United Kingdom | 198/781 |

Primary Examiner—Frank E. Werner
Assistant Examiner—James R. Bidwell
Attorney, Agent, or Firm—Staas & Halsey

[57] ABSTRACT

The invention relates to a loading roller conveyor with drive via intermediate rollers to convey and transport piece goods. An actuator is moved in response to a sensor activated by the piece goods, and intermediate rollers drive support rollers arranged at right angles to the direction of transportation. An actuation device, which is moved by a motor, is displaced between guide rollers and intermediate rollers in the direction of transportation, whereby the intermediate rollers, which are set in motion by the actuation device, are each mounted on a two-part lever joint and which, by way of a shaft shared with the guide roller, are swivel-mounted on two rails running in parallel with the frame, while the hinged shafts are mounted on the actuator with a certain degree of mobility.

10 Claims, 3 Drawing Sheets

FIG. I

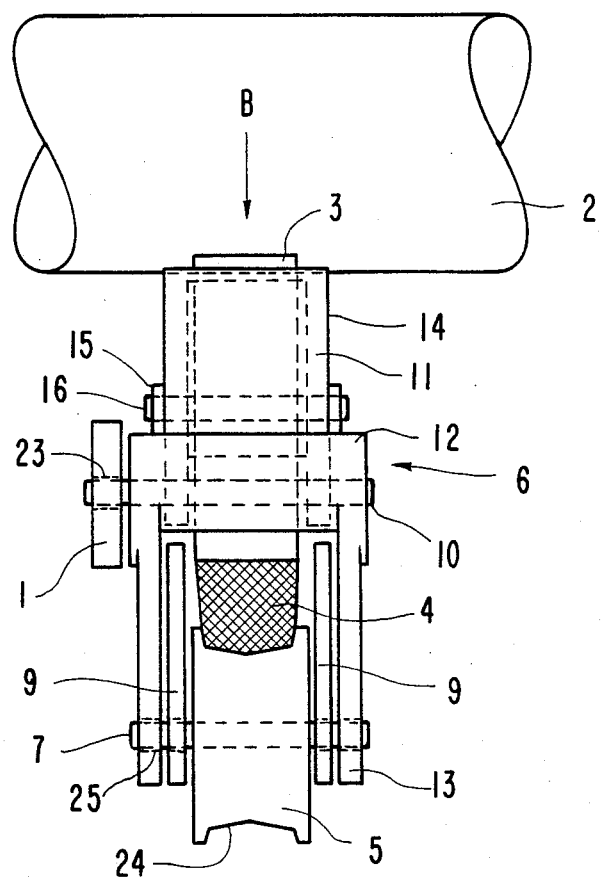
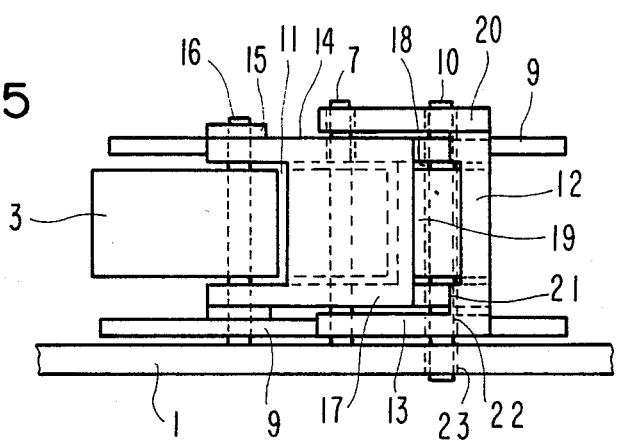

LOADING ROLLER CONVEYOR WITH DRIVE VIA INTERMEDIATE ROLLERS

BACKGROUND OF THE INVENTION

1. Field of the Invention

The invention relates to a loading roller conveyor with drive via intermediate rollers to convey and transport piece goods, comprising an actuator which is moved by means of a sensor activated by the piece goods, and intermediate rollers that drive support rollers arranged at right angles to the direction of transportation, wherein an actuation means, which is moved by a motor, is displaced between guide rollers and intermediate rollers in the direction of transportation, whereby the intermediate rollers, which are set in motion by the actuation means, are each mounted on a two-part lever joint and which, by means of a shaft shared with the guide roller, are swivel-mounted on two rails running parallel with the frame, while the hinged shafts are mounted on the actuator with a certain degree of mobility.

2. Description of the Related Art

The invention relates to a loading roller conveyor.

Currently known loading roller conveyor systems include intermediate rollers which are mounted on a lever arm that can be swiveled about the axis of the support roller. Because of the constructional nature of these levers, there is a continuous swiveling motion about an axis, with the distance between the two rollers always remaining the same.

In this case, it is highly significant that the position of the intermediate roller be set with precision. It has been found that the wear on the intermediate rollers, i.e., the reduction of the diameter, requires a correction in the setting of the intermediate wheel, or the frictional force on the support roller caused by the intermediate roller becomes correspondingly smaller and leads to transport disturbances. the constant efforts to make corrections require a great deal of labor and are highly cost-intensive.

Since in currently known installations the intermediate rollers and their joint shafts, in addition to a guide roller, are installed directly on the frame, it is difficult to carry out the required maintenance work.

SUMMARY OF THE INVENTION

Consequently, the object of the invention is to provide a loading roller conveyor which makes it unnecessary to readjust the intermediate rollers and provides for the arrangement of the actuation means and of the intermediate roller and the lever joint in such a way that any maintenance work can be carried out without hindrance from an ergonomic point of view.

According to the invention, this object is achieved in that an actuation means, which is moved by means of a motor, is displaced between guide rollers and intermediate rollers in the direction of transport, whereby each of the intermediate rollers, moved by the actuation means, is mounted on a two-part lever joint and, by means of a shaft shared by the guide roller, are swivel-mounted on two rails running parallel to the frame, while the articulated shafts are mounted on the actuator with a certain degree of mobility.

A particularly preferred embodiment of the invention is characterized by the fact that the two-part lever joint is comprised of a housing that partly surrounds the intermediate roller, and a cylindrical joint piece which is provided with lever arms.

Another particularly preferred embodiment is characterized by the fact that walls of the housing portion of the lever joint have bumps in which the common shaft is mounted with the intermediate roller, and the wall has two lever arms which extend to the hinged shaft and are pivoted thereon, with the surface of the lever arm acting as a stop.

Another particularly preferred embodiment of the invention is characterized by the fact that the cylindrical joint piece has a one-sided recess as well as a borehole which passes through the inner cylinder and wall and holds the hinged shaft, with each wall passing into a lever arm which is swivel-mounted or pivoted on the rails with the guide roller.

Another particularly preferred embodiment is characterized by the fact that the cylindrical joint piece has two stop dogs in the area of its recess and the actuator is provided with boreholes which hold the hinged shafts.

Another particularly preferred embodiment is characterized by the fact that the guide rollers are provided with a groove adapted to the shape of the actuation means.

Another particularly preferred embodiment is characterized by the fact that boreholes are arranged in the rails for the swivel shaft shared by the joint piece and the guide rollers locating the latter.

Another particularly preferred embodiment is characterized by the fact that the rails are fastened by means of retaining clips to the crossarms, which are disposed at right angles to the direction of transport, parallel to the support rollers.

Another particularly preferred embodiment is characterized by the fact that the frame profiles have the shape of a capital U and their bars are provided with hexagonal holes which hold the support rollers or the crossarms.

BRIEF DESCRIPTION OF THE DRAWINGS

The invention will now be discussed more fully with reference to the accompanying drawings, which show a particularly preferred embodiment of the invention. In the drawings:

FIG. 4 is a view from the direction A indicated in FIG. 3; and

FIG. 5 is a view from the direction B indicated in FIG. 4.;

FIG. 1 is a perspective view of a portion of a loading roller conveyor. In order not to obscure the view, only one support roller 2 between the U-shaped frame 8 is shown with one intermediate roller 3. In practice, there are matched to the transport path several of these roller combinations connected in series. Each support roller 2 has a shaft 30 on its front side, with which it is provided in the holes 29 of the frame 8.

Figure 1:
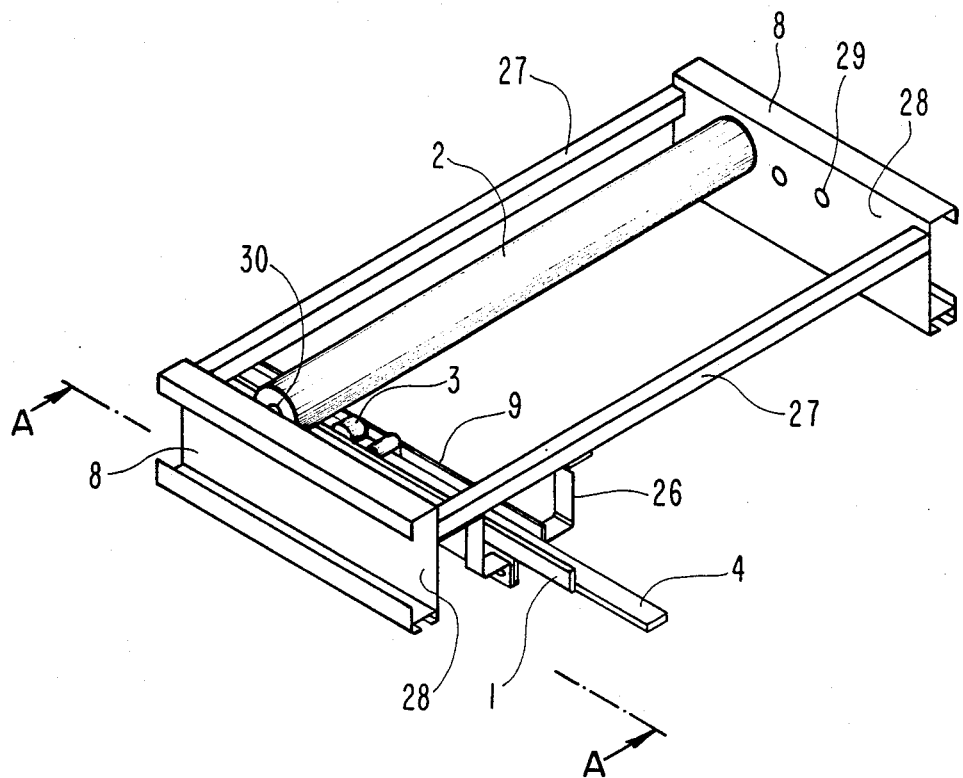
FIG. 1 is a perspective view of a section of the loading roller conveyor.

An actuation means4, moved by means of a motor and preferably consisting of a V-belt or the like, will constantly keep the intermediate roller 3 in rotary motion.

By means of a sensor, not described more fully herein and activated by the articles being transported, the actuator 1 is moved in the direction of transport or in the opposite direction and, in the process, sets the intermediate rollers 3 into the working or the home position.

The intermediate rollers 3 are supported between two rails 9 running parallel to the frame and fastened by means of retaining clips 26 to the crossarms 27 arranged in parallel with the support rollers 2.

Figure 2:
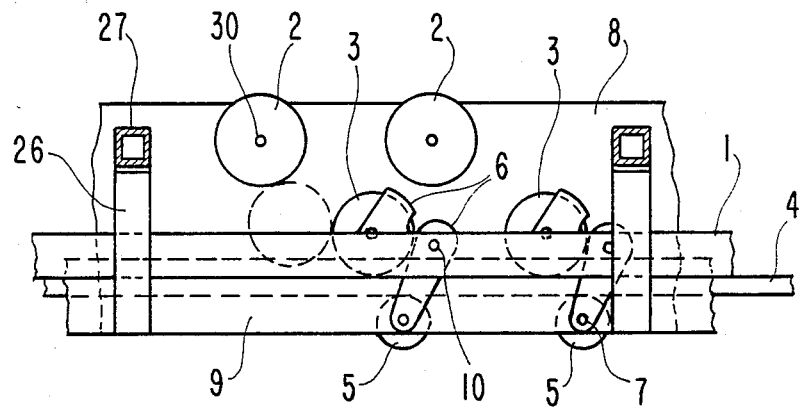
FIG. 2 is a longitudinal sectional view taken along the line A—A of FIG. 1, which illustrates the arrangement of the rollers on the frame.

FIG. 2 is a longitudinal sectional view of the loading roller conveyor taken along the line A—A indicated in FIG. 1. This figure shows the arrangement of several pairs of rollers connected in series.

Figure 3:
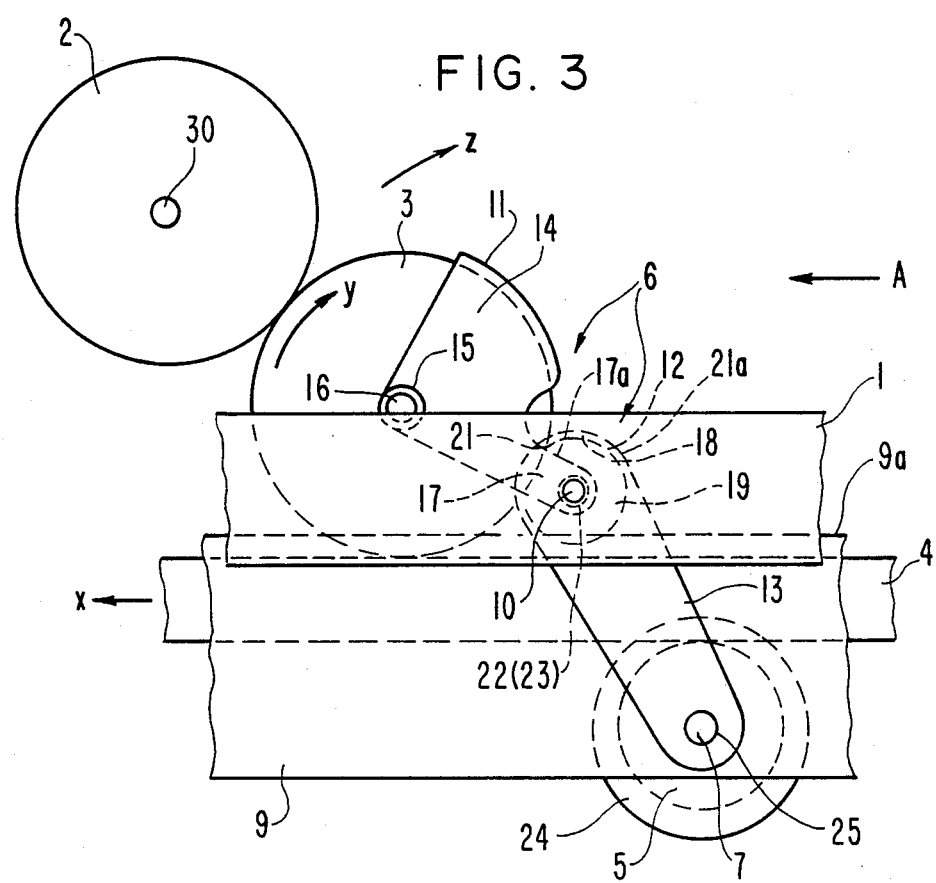
FIG. 3 shows a detail of a support roller with an intermediate roller engaging same.

FIG. 3 illustrates the interaction between support rollers 2 and intermediate rollers 3. As described earlier, a V-belt or similar actuation means 4 is set in motion by means of a driving assembly in the direction of transport "x" and, in the process, constantly drives the intermediate rollers 3 in the direction "y".

The intermediate roller 3 has a shaft 16 it shares with the lever joint 6. The lever joint 6 consists of two parts: a housing-type lever portion 11, shaped like a quadrant, which partly surrounds the intermediate roller 3, and a joint piece 12.

The walls 14 of the housing portion 11 have on each side a bump 15 through which passes the common rotational shaft 16 with the intermediate roller 3.

Starting from the bumps 15, lever-shaped arms 17 extend to the hinged shaft 10.

When there is a tipping motion of the intermediate roller 3 about the shaft 10 in the direction "z", the surface 17a of the lever arms 17 abuts on the dogs 21 within the recess 18 on the joint piece 12 so as to prevent the intermediate roller 3 from going too far.

From both sides of the cylindrical joint piece 12, integrally formed lever arms 13 extend to the shaft 7 of the guide roller 5.

This arrangement enables the entire lever joint 6 to swivel about the shaft 7. The swiveling motion is stopped when the lower edge 21a of the cylinder wall abuts on the surface 9a of the rail 9.

FIG. 4 shows the pairs of rollers from the direction A indicated in FIG. 3, in mesh with the support roller 2. This figure shows the shaft 16 of the intermediate roller 3, the hinged shaft 10, and the shaft of the guide roller 5. The pairs of rollers are engaged when the actuation means 4, preferably a V-belt, moves the intermediate roller 3 and the latter moves the support roller 2, causing the actuator 1 to set the lever joint 6, i.e., the joint pieces 11 and 12, into the working position. The guide roller 5 has a groove 24, which is adapted to the shape of the V-belt 4.

FIG. 5 is a view of the joint pieces from the direction B shown in FIG. 5, but in the interest of clarity, they are not shown in the working position so as to show in recognizable form the inner cylinder 19 of the cylindrical joint piece 12.

The entire constructional arrangement of the guide roller, intermediate roller, and support roller, together with their swiveling lever joints, shows an improvement of the loading roller conveyors and provides an installation which carries piece goods in an automatically controlled fashion via the roller conveyor such that constant adjustments due to wear of the intermediate rollers are unnecessary.

What is claimed is:

1. A loading roller conveyor with drive via intermediate rollers for conveying and transporting piece goods, comprising an actuator (1), and intermediate rollers (3) which drive support rollers (2) mounted at right angles to the direction of transportation, wherein an actuation means (4), is displaced between guide rollers (5) and intermediate rollers (3), whereby the intermediate rollers (3), which are rotated by the actuation means (4), are each mounted on an upper part of a two-part lever joint (6), a lower part of each lever joint being swivel-mounted, by means of a shaft (7) shared by the guide roller (5), on two rails (9) running parallel to a frame (8), while hinged shafts (10) connecting the upper and lower parts of each lever joint also rotatably mounted on the actuator (1) whereby the actuator by virtue of it's pivotal connection to the hinged shafts will shift the lever joints so as to cause positive engagement or disengagement of the intermediate rollers with the support rollers.

2. A loading roller conveyor with drive via intermediate rollers as set forth in claim 1, wherein the two-part lever joint (6) is comprised of a housing (11) which partly surrounds the intermediate roller (3), and a cylindrical joint piece (12) provided with lever arms (13).

3. A loading roller conveyor with drive via intermediate rollers as set forth in claim 2, wherein the housing portion (11) of the lever joint (6) has on its walls (14) bumps in which a common shaft (16) is disposed with the intermediate roller (3) and the wall (14) has two lever arms (17) extending to the hinged shaft (10) and pivoted thereon, with the surface (17a) of the lever arms acting as a stop.

4. A loading roller conveyor with drive via intermediate rollers as set forth in claim 3, wherein the cylindrical joint piece (12) has a one-sided recess (18) and a borehole (22) passed through the inner cylinder (19) and the wall (20) and holding the hinged shaft (10), with each of the walls (20) passing into a lever arm (13), which are swivel-mounted or pivoted on the rails (9) together with the guide roller (5).

5. A loading roller conveyor with drive via intermediate rollers as set forth in claim 4, wherein the cylindrical joint piece (12) has two stop dogs (21) in the area of its recess (18).

6. A loading roller conveyor with drive via intermediate rollers as set forth in claim 5, wherein the actuator (1) is provided with boreholes (23) which hold the hinged shafts (10).

7. A loading roller conveyor with drive via intermediate rollers as set forth in claim 1, wherein the guide rollers (5) are provided with a groove (24) adapted to the shape of the actuation means (4).

8. A loading roller conveyor with drive via intermediate rollers as set forth in claim 2, wherein boreholes are arranged in the rails (9) for the common swiveling shaft (7) of the joint piece (12) holding the guide rollers (5).

9. A loading roller with drive via intermediate rollers as set forth in claim 8, wherein the rails (9) are fastened by means of retaining clips (26) to crossarms (27) mounted at right angles to the direction of transportation.

10. A loading roller with drive via intermediate rollers as set forth in claim 1, wherein the frame profiles (8) are U-shaped and their bars (28) are provided with hexagonal holes (29) holding the support rollers (2) and the crossarms (27).

* * * * *